June 11, 1929.  D. L. WILLIAMS  1,717,134

BEAD TURNING MACHINE

Filed Aug. 6, 1925

INVENTOR
Dayton L. Williams.
BY
ATTORNEY

Patented June 11, 1929.

1,717,134

UNITED STATES PATENT OFFICE.

DAYTON L. WILLIAMS, OF AKRON, OHIO, ASSIGNOR TO THE GOODYEAR TIRE & RUBBER COMPANY, OF AKRON, OHIO, A CORPORATION OF OHIO.

BEAD-TURNING MACHINE.

Application filed August 6, 1925. Serial No. 48,538.

My invention relates to bead turning machines and it has particular reference to a machine adapted to displace the core of a composite bead relative to its covering.

The employment of beads in the construction of pneumatic tires is well understood. Beads comprising a core and a cover are also known. One type of composite bead consists of a steel cable to which is secured a cover of rubber. Heretofore, the bead has been assembled in the tire carcass with the rubber in a semi-vulcanized condition firmly adhering to the steel core.

It has been found that, if a tire carcass embodying a composite bead be assembled on a cylindrical mandrel, the tire, after being shaped and vulcanized will not retain its correct position. The bead portions of the tire separate. This is believed to be caused by torsional stresses set up in the cable portion of the bead when the tire carcass is bent from its flat position into a toroidal shape. It has been discovered that if the cable be loosened within the cover prior to the assembly of the bead with the carcass, there is no displacement of the bead portions after vulcanization. This is because the cable is free to rotate within the cover of the bead when the tire is shaped and hence the displacing forces are neutralized. This discovery and its application are more fully described in a copending application of Ross E. Jenkinson, Serial Number 49,115 filed August 8, 1925, Patent No. 1,659,321, Feb. 14, 1928, and assigned to The Goodyear Tire & Rubber Co.

It is the object of this invention to provide a machine by means of which the cover of the bead may be displaced or turned relative to the core. One embodiment is shown in the drawings, wherein.

Figure 1:
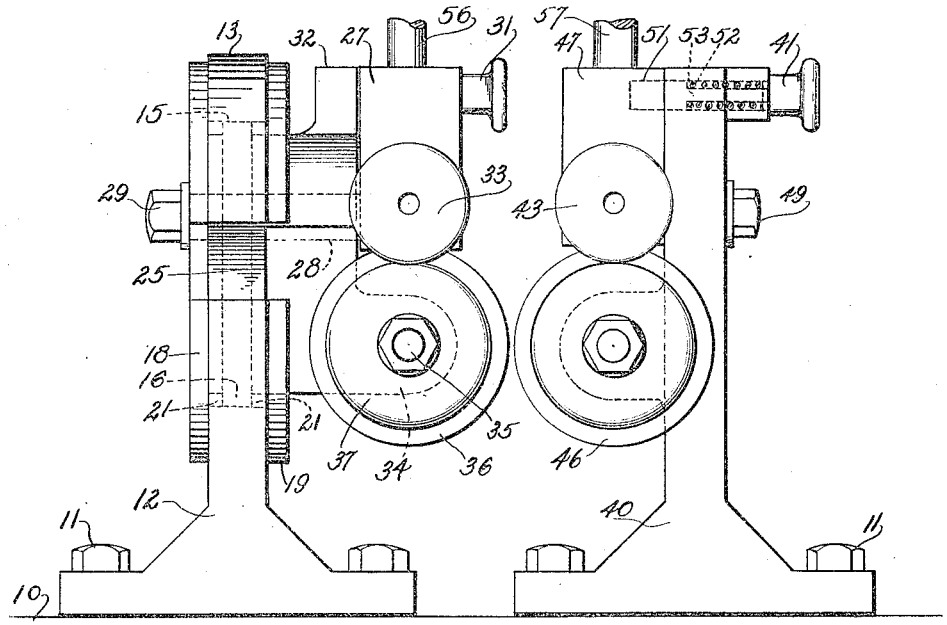
Fig. 1 is a front elevational view of the machine.

The machine comprises a table 10 to which is secured, by suitable means such as screws 11, supports 12 and 40. The support 12 has a circular upper portion 13 which is spaced from the support on one side, as indicated at 14. The member 12 is provided with an annular opening 15 adapted to receive a collar 16 of a rotatable block 17. Annular side plates 18 and 19, each provided with a shoulder 21, which engages the collar 16, are secured to the sidewalls of the support 12 by suitable means, such as screws 22. To facilitate assembly, the plates may be made in two sections, as indicated at 23 in Fig. 2. When the plates are secured to the block 12, means is thereby provided to retain the member 17 within the support 12 and at the same time permit of its rotation.

The block 17 is cut away in the plane of the support, as indicated at 25. The right-hand face of the block, as viewed in Fig. 1, is provided with projecting portions which serve as supports for other elements of the machine. A bearing member 27 is secured to the upper portion of the rotatable block 17 by means of a bolt 28, integral with the bearing, and passing through the block and is secured thereto by suitable means, such as a nut 29. The bolt 28 is loosely fitted so that the bearing 27 is free to revolve with respect to the block 17. The bearing 27 is held in position by a pin 31, which passes through the upper portion of the bearing and is secured in an upstanding lug 32 on the projecting portion of the block 17. A shaft passes through the lower portion of the bearing 27 and has mounted on its projecting end a convex roller 33.

Figures 2, 3:
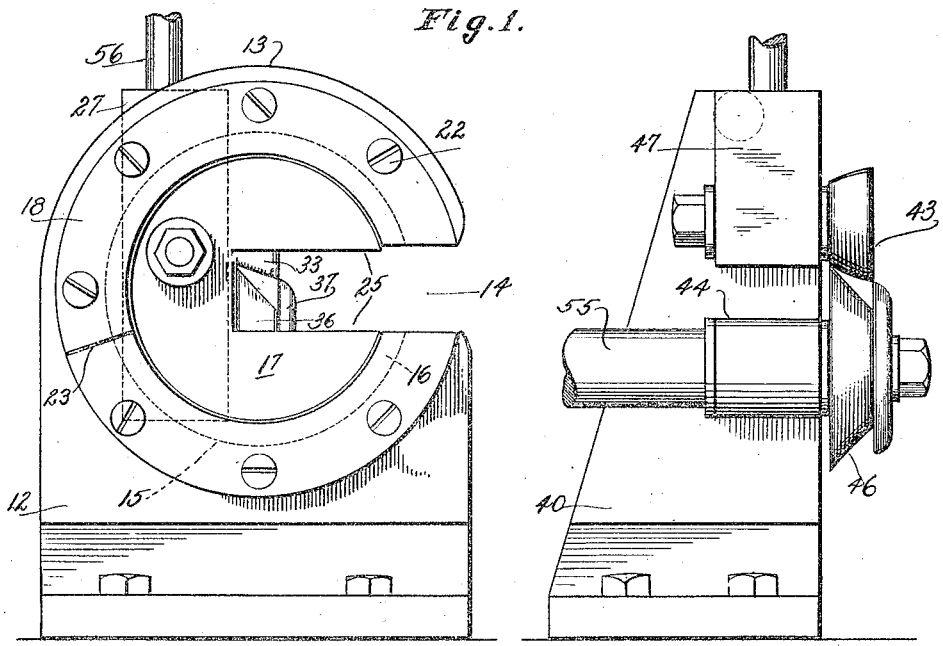
Fig. 2 is a side elevational view of the left-hand portion of the machine shown in Fig. 1.
Fig. 3 is a side elevational view of the right-hand portion of the machine shown in Fig. 1.

A bearing 34 is formed in the lower end of the projecting part of the member 17. This bearing has mounted in it a shaft 35 on the outer end of which is secured a concave roller 36 having a flanged portion 37. Rollers 33 and 36 contact with each other as shown in Figs. 2 and 3. The space between the contacting edges of the rollers corresponds substantially to the cross-sectional area of the bead which is to be turned.

The support 40 has mounted thereon rollers 43 and 46, corresponding to the rollers 33 and 36 and which are preferably in respective alignment with each other. The roller 43 is mounted on a bearing block 47, which is secured to the support 40 by a pin that is held by suitable means, such as a nut 49. A headed pin 41, mounted in the block 40, projects into a recess 51 in the bearing 47. A spring 52, surrounding the reduced portion 53 of the pin 51, holds the pin in position. The roller 46 is mounted on the support 40 by means of a bearing block 44. A shaft 55, journaled in the bearing 44, is connected to a suitable source of driving power, not shown.

It will be apparent that the rollers 33 and 36 may be rotated together around the axis of the member 17. The rollers 33 and 43 may be tilted back from their normal engagement with the rollers 36 and 46 by pulling out the pins 31 and 41 and turning the bearings 27 and 47 on their supporting pins. Levers 56 and 57 mounted in the bearings 27 and 47, provide means to facilitate this turning movement.

The operation of the machine is substantially as follows. The parts of the machine are brought in the position shown in Fig. 1. A bead is then inserted between the rollers 33 and 36, and 43 and 46, respectively, by pulling out the pins 31 and 41, turning back the bearings 27 and 47, and inserting the bead in the grooves in the rollers 36 and 46. The bearing members 27 and 47 are then brought to an upright position and the rollers 33 and 43 pressed firmly against the bead member. The trailing side of the bead projects through the cut away portion 25 of the rotatable member 17. The shaft 55, which is connected to a suitable source of power, is then actuated to effect rotation of the roller 46, which causes rotation of the roller 43 and imparts longitudinal movement to the bead. As the bead is forced between the rollers 43 and 46, the member 17 is rotated, which turning movement twists the bead and the resulting torsional stress causes the rubber cover to break away from the core. When the cover has been loosened from the core throughout the entire length of the bead, it is ready to be applied to a tire carcass in the manner disclosed in the copending application referred to above.

From the foregoing description, it will be seen that a machine is provided to loosen the covering upon the core of a composite bead, and that while the machine is simple in construction, it is very efficient in operation. While the invention has been described in connection with beads used in the manufacture of automobile tires, it is to be understood that it is capable of application in other arts where the same results may be desirable. A specific embodiment of the invention has been shown, but it is apparent that the principles set forth may be attained in a variety of ways. Accordingly, only such limitations should be imposed as are set forth in the following claims.

What I claim is:

1. A bead turning machine comprising means to grip the bead, means to impart a peripheral motion of rotation thereto, and means for progresisvely twisting the bead about the line of peripheral rotation thereof.

2. A bead turning machine comprising independent aligned units to grip a bead, one unit being rotatable with respect to the other, about the circumferential axis of the bead to loosen the bead cover upon the core.

3. A bead turning machine comprising a support, a member rotatable in the support, about the circumferential axis of the bead, bead gripping elements mounted on the member, and additional bead gripping elements cooperatively disposed with respect thereto to twist the bead cover upon the bead core as the latter moves through the gripping elements.

4. A bead turning machine comprising a plurality of supports, rollers mounted on one of the supports, and movable bead gripping means rotatable about the circumferential axis of the bead mounted adjacent the rollers, operating in conjunction with the roller members to subject a bead to torsional stress.

5. A bead turning machine comprising a plurality of supports, rollers mounted on each support, the rollers mounted on one support being rotatable as a unit with respect to the remaining rollers.

6. A bead turning machine comprising a support having a slot therein, a slotted block rotatably mounted in the support, a roller having a fixed axis mounted upon the block, a pivoted bearing having an additional roller thereon and a lock to secure the pivoted bearing in a predetermined position with respect to the first-mentioned roller.

7. A bead turning machine comprising a support having a shaft mounted thereon, a flanged roller mounted on the shaft, a pivoted block mounted above the shaft and a roller mounted on the block with its surface adjacent that of the flanged roller, the space between the rollers being substantially similar to the cross-sectional contour of a bead.

8. A bead turning machine comprising a table having a plurality of supports thereon, each support being provided with two rollers one of which is movable with respect to the other, means to fix the position of the movable rollers, the rollers on one support being rotatable as a unit with respect to the rollers on the other support.

9. A machine for loosening the cover of a bead having an inextensible core comprising a support, a plurality of spaced bead gripping members mounted upon the support, and means for moving the members with respect to each other for causing relative movement between the bead cover and the inextensible core to loosen the cover upon the latter.

10. A bead turning machine comprising a base, two pairs of bead-engaging rollers mounted thereon, one pair of rollers being rotatable as a unit about an axis lying in the plane thereof.

11. A bead turning machine comprising a base, two pairs of rollers mounted thereon, means to move one of each pair of rollers toward or from the other roller, one pair of rollers being rotatable as a unit about an axis in the plane thereof.

12. A bead turning machine comprising means to grasp one portion of a bead, a second means for grasping another portion of the bead, one means being rotatable with respect to the other about the peripheral axis of the bead for applying a twisting force to the cover of the bead.

In witness whereof, I have hereunto signed my name.

DAYTON L. WILLIAMS.